(12) United States Patent
Lee et al.

(10) Patent No.: US 10,627,974 B1
(45) Date of Patent: Apr. 21, 2020

(54) TOUCH DISPLAY APPARATUS AND BACKLIGHT MODULE

(71) Applicant: CHAMP VISION DISPLAY INC., Miao-Li County (TW)

(72) Inventors: Hsin-Hung Lee, Miao-Li County (TW); Chung-Hao Wu, Miao-Li County (TW); Kun-Hsien Lee, Miao-Li County (TW); Chin-Ku Liu, Miao-Li County (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 16/368,877

(22) Filed: Mar. 29, 2019

(51) Int. Cl.
| | |
|---|---|
| *G06F 3/046* | (2006.01) |
| *F21V 8/00* | (2006.01) |
| *G02F 1/13357* | (2006.01) |
| *G02F 1/1333* | (2006.01) |
| *G06F 3/041* | (2006.01) |
| *G09G 3/34* | (2006.01) |
| *G06F 3/0354* | (2013.01) |

(52) U.S. Cl.
CPC ........... *G06F 3/046* (2013.01); *G02B 6/0035* (2013.01); *G02B 6/0051* (2013.01); *G02F 1/13338* (2013.01); *G02F 1/133606* (2013.01); *G06F 3/03545* (2013.01); *G06F 3/04162* (2019.05); *G09G 3/3406* (2013.01); *G02F 2001/133626* (2013.01); *G09G 2320/0626* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2010/0289755 | A1* | 11/2010 | Zhu | G06F 3/042 345/173 |
| 2011/0122075 | A1* | 5/2011 | Seo | G06F 3/042 345/173 |
| 2011/0221705 | A1* | 9/2011 | Yi | G06F 3/0425 345/175 |
| 2012/0032926 | A1* | 2/2012 | Douxchamps | G02F 1/13338 345/175 |

(Continued)

FOREIGN PATENT DOCUMENTS

| | | |
|---|---|---|
| TW | 571161 | 1/2004 |

*Primary Examiner* — Nitin Patel
*Assistant Examiner* — Amen Woldesenbet Bogale
(74) *Attorney, Agent, or Firm* — JCIPRNET

(57) ABSTRACT

A touch display apparatus and a backlight module are provided. The touch display apparatus includes the backlight module and a display module. The backlight module includes an electromagnetic resonance (EMR) sensing module, an edge-type light source module and a direct-type light source module. The EMR sensing module emits an electromagnetic signal to a stylus pen. The edge-type light source module includes a light guide plate disposed above the EMR sensing module and a first light source apparatus disposed beside the light guide plate. A second light source apparatus of the direct-type light source module includes a substrate disposed between the edge-type light source module and the EMR sensing module and a plurality of second light sources disposed on a surface of the substrate. The display module is disposed above the backlight module.

12 Claims, 5 Drawing Sheets

(56) References Cited

U.S. PATENT DOCUMENTS

| | | | |
|---|---|---|---|
| 2012/0162127 A1* | 6/2012 | Onoda | G06F 3/038 |
| | | | 345/174 |
| 2012/0169642 A1* | 7/2012 | Lee | G06F 1/182 |
| | | | 345/173 |
| 2013/0250190 A1* | 9/2013 | Yoo | G02F 1/13338 |
| | | | 349/12 |
| 2014/0333519 A1* | 11/2014 | Lee | G06F 3/046 |
| | | | 345/102 |
| 2015/0051835 A1* | 2/2015 | Jung | G01C 21/3664 |
| | | | 701/533 |
| 2017/0153748 A1* | 6/2017 | Choi | G06F 3/044 |

* cited by examiner

TOUCH DISPLAY APPARATUS AND BACKLIGHT MODULE

BACKGROUND

Technical Field

The invention relates to a display technology. More particularly, the invention relates to a touch display apparatus and a backlight module.

Description of Related Art

At present, with the development of science and technology, electronic drawing boards have begun to be used in daily life to replace writing, drawing, or signing on traditional paper. There are two primary technologies for stylus pens, and those are Electromagnetic Resonance (EMR) technology and Active Electrostatic (AES) technology. The EMR technology allows a stylus pen to operate without cords or batteries as writing, drawing or signing since the display is the active digitizer and the stylus pen is the passive part, which means the pen doesn't need to be charged. Therefore, it's lighter, less expensive to replace if it breaks and these are reasons that the EMR stylus pen becomes popular. However, the display quality of the existing electronic drawing boards, especially for art drawings, fails to achieve the high dynamic range (HDR) imaging standard because of the touch sensing device configured within the display panel. Therefore, how to propose a touch display apparatus having an electronic drawing function but also having an HDR display quality has become a problem to be solved.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

Embodiments of the disclosure provide a touch display apparatus and a backlight module, which have an electronic drawing function and also provide the HDR display quality.

The objectives and advantages of the disclosure may be further understood in the technical features disclosed in the disclosure.

To achieve one or a part or all the objectives or other objectives, an embodiment of the disclosure provides a touch display apparatus. The touch display apparatus includes a backlight module and a display module. The backlight module includes an electromagnetic resonance (EMR) sensing module, an edge-type light source module and a direct-type light source module. The EMR sensing module is configured to emit an electromagnetic signal to a stylus pen. The edge-type light source module includes a light guide plate and a first light source apparatus. The light guide plate is disposed above the EMR sensing module. The first light source apparatus is disposed beside the light guide plate for emitting a first illumination beam into the light guide plate. A second light source apparatus of the direct-type light source module includes a substrate and a plurality of second light sources. The substrate is disposed between the edge-type light source module and the EMR sensing module. The plurality of the second light sources are disposed on a surface of the substrate and configured to emit a second illumination beam toward the edge-type light source module. The display module is disposed above the backlight module.

To achieve one or a part or all the objectives or other objectives, an embodiment of the disclosure provides a backlight module. The backlight module is adapted to a touch display apparatus and includes an electromagnetic resonance (EMR) sensing module, an edge-type light source module and a direct-type light source module. The EMR sensing module is configured to emit an electromagnetic signal to a stylus pen. The edge-type light source module includes a light guide plate and a first light source apparatus. The light guide plate is disposed above the electromagnetic resonance sensing module and the first light source apparatus is disposed beside the light guide plate for emitting a first illumination beam into the light guide plate. A second light source apparatus of the direct-type light source module includes a substrate and a plurality of second light sources. The substrate is disposed between the edge-type light source module and the EMR sensing module and the plurality of the second light sources are disposed on a surface of the substrate and configured to emit a second illumination beam toward the edge-type light source module.

Based on the above, the touch display apparatus and the backlight module of the embodiments of the disclosure have the effect of displaying HDR images by utilizing the direct-type light source module when performing a display mode and providing touch sensing function by utilizing the edge-type light source module when performing a touch mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
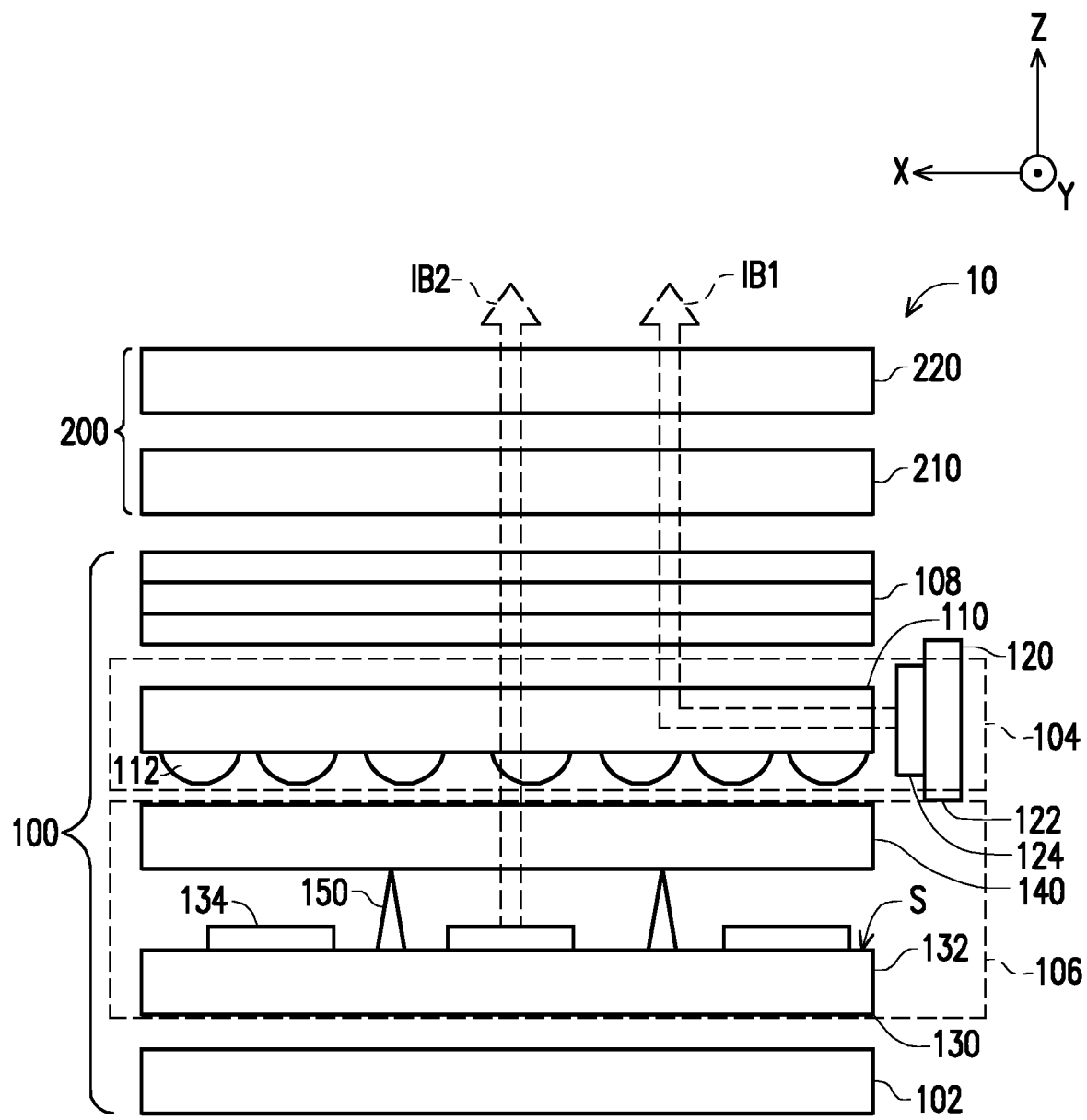
FIG. 1 is a structure schematic diagram of a touch display apparatus according to an embodiment of the disclosure.

FIG. 1 is a structure schematic diagram of a touch display apparatus according to an embodiment of the disclosure. Referring to FIG. 1, the touch display apparatus 10 includes a backlight module 100 and a display module 200.

The backlight module 100 includes an electromagnetic resonance (EMR) sensing module 102, an edge-type light source module 104 and a direct-type light source module 106. The EMR sensing module 102 is configured to emit an electromagnetic signal to a stylus pen. The edge-type light source module 104 includes a light guide plate 110 and a first light source apparatus 120. The light guide plate 110 is disposed above the EMR sensing module 102 along the Z direction. The first light source apparatus 120 is disposed beside the light guide plate 110 for emitting a first illumination beam IB1 into the light guide plate 110. Specifically, the first light source apparatus 120 includes a substrate 122 and a plurality of first light sources 124 disposed on a surface of the substrate 122. The plurality of first light source 124 are configured to emit the first illumination beam IB1, for instance, mainly along the X direction. The light guide plate 110 guides the first illumination beam IB1 to propagate along the Z direction after leaving the light guide plate 110.

The direct-type light source module 106 is disposed between the EMR sensing module 102 and the edge-type light source module 104 and at least includes a second light source apparatus 130. The second light source apparatus 130 includes a substrate 132 and a plurality of second light sources 134. The substrate 132 is disposed between the edge-type light source module 104 and the EMR sensing module 102 along the Z direction. The plurality of the second light sources 134 are disposed on a surface S of the substrate 132 and configured to emit a second illumination beam IB2 toward the edge-type light source module 104. Specifically, the second illumination beam IB2 is transmitted along the Z direction towards the user's eyes.

The display module 200 is disposed above the backlight module 100 along the Z direction and receives illumination beams (the first illumination beam IB1 and the second illumination beam IB2) emitted from the backlight module 100. The display module 200 converts the illumination beams to image beans for users watching.

The backlight module 100 further includes an optical film module 108. The optical film module 108 may include a diffuser sheet, a prism sheet or a dual brightness enhancement film (DBEF). The disclosure does not limit types and numbers of the optical films of the optical film module 108. The display module 200 includes a display panel 210 and a protection layer 220. The display panel 210 is disposed under the protection layer 220 and may be disposed between the optical film module 108 and the protection layer 220. In the embodiment, the display panel 210 is a liquid crystal display panel and the protection layer 220 is a glass layer, but not limited thereto.

In the embodiment, the direct-type light source module 106 further includes a diffuser plate 140. The diffuser plate 140 is disposed between the second light source apparatus 130 and the light guide plate 110. The direct-type light source module 106 further includes at least one support device 150. In FIG. 1, there are a plurality of support devices 150 and the number of the support devices 150 is not limited. The support devices 150 are disposed on the surface S of the substrate 132 with the second light sources 134 and configured to support the diffuser plate 140. It should be noted that the support devices 150 can be selectively omitted in some embodiments.

Figure 2A:
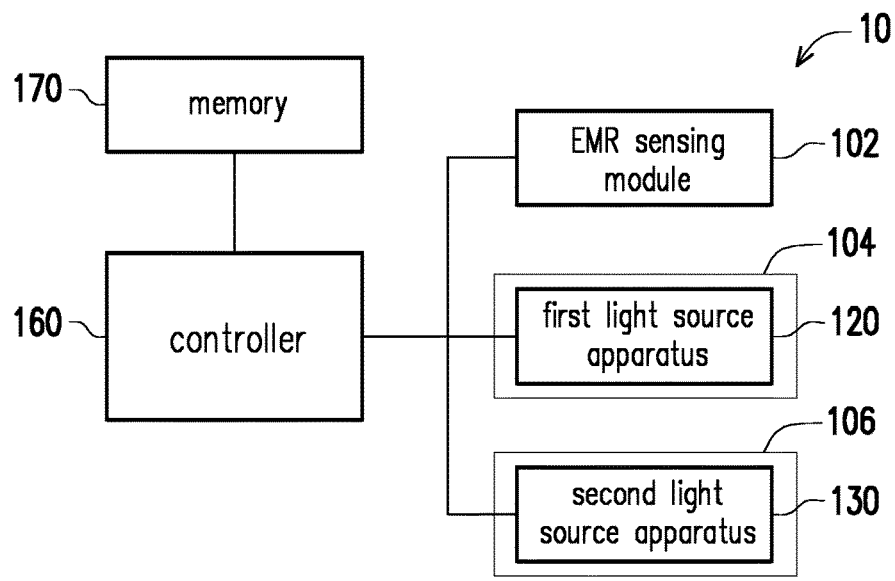
FIG. 2A is a schematic block diagram of a touch display apparatus according to an embodiment of the disclosure.
Figure 2B:
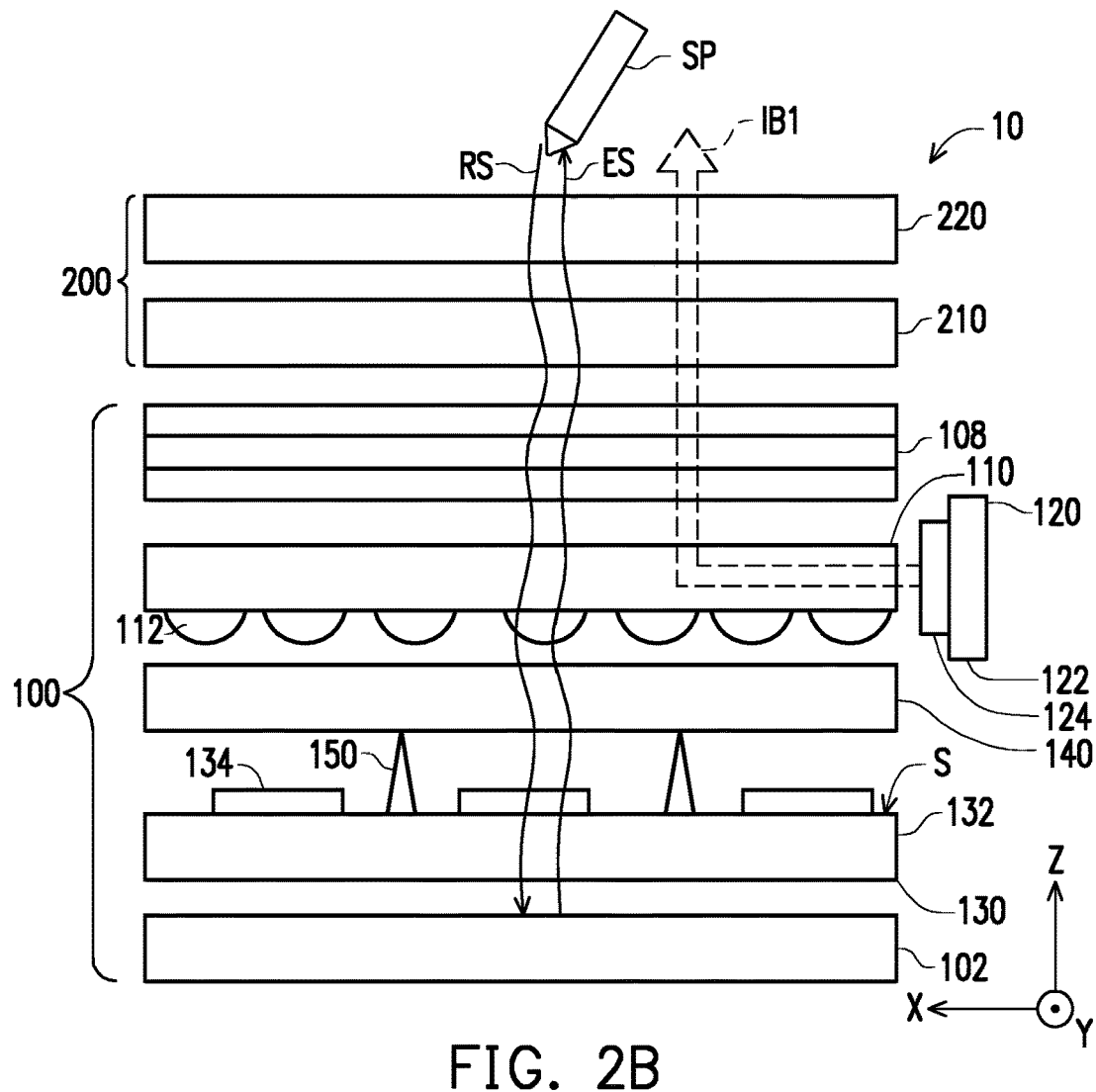
FIG. 2B is a schematic diagram showing a touch display apparatus performing a touch mode according to an embodiment of the disclosure.
Figure 2C:
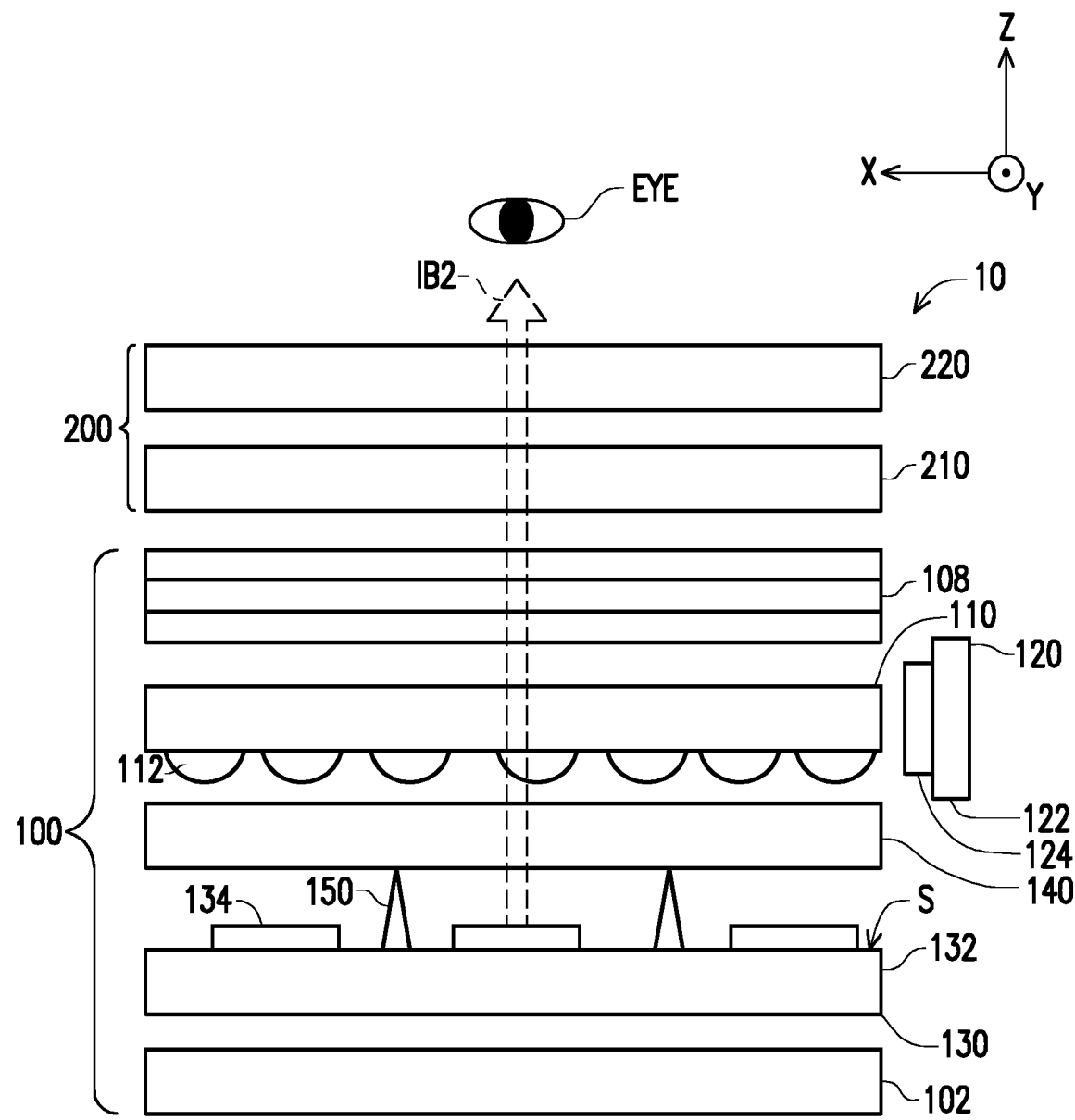
FIG. 2C is a schematic diagram showing a touch display apparatus performing a display mode according to an embodiment of the disclosure.

FIG. 2A is a schematic block diagram of a touch display apparatus according to an embodiment of the disclosure, FIG. 2B is a schematic diagram showing a touch display apparatus performing a touch mode according to an embodiment of the disclosure and FIG. 2C is a schematic diagram showing a touch display apparatus performing a display mode according to an embodiment of the disclosure. Referring to FIG. 2A to FIG. 2C, the touch display apparatus 10 further includes a controller 160. The controller 160 is electrically connected to the EMR sensing module 102, the edge-type light source module 104 and the direct-type light source module 106. When the touch display apparatus 10 performs a touch mode, referring to FIG. 2B, the controller 160 makes the EMR sensing module 102 sense a touch event. The touch event includes at least one parameter data such as a coordinate or time and is caused by a stylus pen SP touching or approaching to the touch display apparatus 10. At the same time, the controller 160 enables the first light source apparatus 120 to provide the first illumination beam IB1 and turns off the second light source apparatus 130. When the touch display apparatus 10 performs a display mode, referring to FIG. 2C, the controller 160 turns off the EMR sensing module 102 and the first light source apparatus 120, and makes the second light source apparatus 130 provide the second illumination beam IB2 to user's eyes EYE.

Users can select to operate the touch display apparatus 10 in the display mode or in the touch mode, or the touch display apparatus 10 can switch between these two modes automatically. In an embodiment, the stylus pen SP may be stored in a slot or a chamber into the touch display apparatus 10 and when the touch display apparatus 10 detects the stylus pen SP is pulled out of the touch display apparatus 10, the controller 160 executes the touch mode automatically. In another embodiment, when the EMR sensing module 102 does not receive a response signal RS from the stylus pen SP for more than or equal to a threshold time (e.g. 30 seconds) in the touch mode, the controller 160 switches the touch mode to the display mode automatically. The disclosure provides no limitation to the implementations of switching between the display mode and the touch mode.

In the embodiment, in the touch mode, the EMR sensing module 102 emits the electromagnetic signal ES to the stylus pen SP and the stylus pen SP transforms the electromagnetic signal ES into electrical energy. The electrical energy is then used to generate touch data, such as pressure, tilt angle and others, but not limited thereto. The stylus pen SP converts touch data into a response signal RS and sends the response signal RS back to the EMR sensing module 102. The EMR sensing module 102 sense the touch event according to the response signal RS.

The controller 160 may further perform a touch sensing compensation on the response signal RS or the electromagnetic signal ES according to pre-stored interference result of electromagnetic waves passing through the unpowered second light source apparatus 130. In detail, the touch display apparatus 10 further includes a memory 170. The memory 170 is electrically connected to the controller 160 and stores a plurality of software modules. The controller 160 may load and execute these software modules to execute a plurality of commands. One of the software modules is a touch sensing compensation software module which records the interference result of electromagnetic waves passing through the unpowered second light source apparatus 130. The interference result can be calculated or measured previously, for instance, during the manufacturing process. The controller 160 may execute the touch sensing compensation software module to compensate for the changes of the electromagnetic signal ES emitted from the EMR sensing module 102 or the response signal RS received by the EMR sensing module 102 after penetrating the second light source apparatus 130. It should be noted that the second light source apparatus 130 is turned off and the EMR sensing module 102 is enabled to emit the electromagnetic signal ES and receive the response signal RS when the touch display apparatus 10 performs the touch mode.

In the display mode, the second light source apparatus 130 emits the second illumination beam IB2 penetrating the light guide plate 110 to user's eyes EYE, and the controller 160 may further performs a brightness compensation on the second illumination beam IB2 according to the pattern of the light guide plate 110. One of the software modules stored in the memory 170 is a brightness compensation software module which records the pattern of the light guide plate 110. There are a plurality of light guide element 112 configured on the surface of the light guide plate 110 to form the pattern in order to guide the light towards the outside. The light guide element 112 may be a grid, a fine dot, a groove or a reflective spot, which is not limited by the disclosure. The controller 160 may execute the brightness compensation software module to compensate for the changes of the second illumination beam IB2 after penetrating the light guide plate 110.

In addition, the controller 160 may further performs local dimming on the second light source apparatus 130 in the display mode to achieve high dynamic contrast display effect. Therefore, the second light sources 134 are divided into multiple blocks and the controller 160 controls the brightness of the blocks according to the display data.

In brief, when the touch display apparatus 10 performs the touch mode, the first light source apparatus 120 provides the first illumination beam IB1 to display what the user is drawing, writing or signing, and when the touch display apparatus 10 switches to the display mode, the second light source apparatus 130 provides the second illumination beam IB2 to display images. Since the second light source apparatus 130 is capable of performing a local dimming function, the touch display apparatus 10 can increase the contrast ratio of image and achieve high dynamic contrast display effect.

Figure 3:
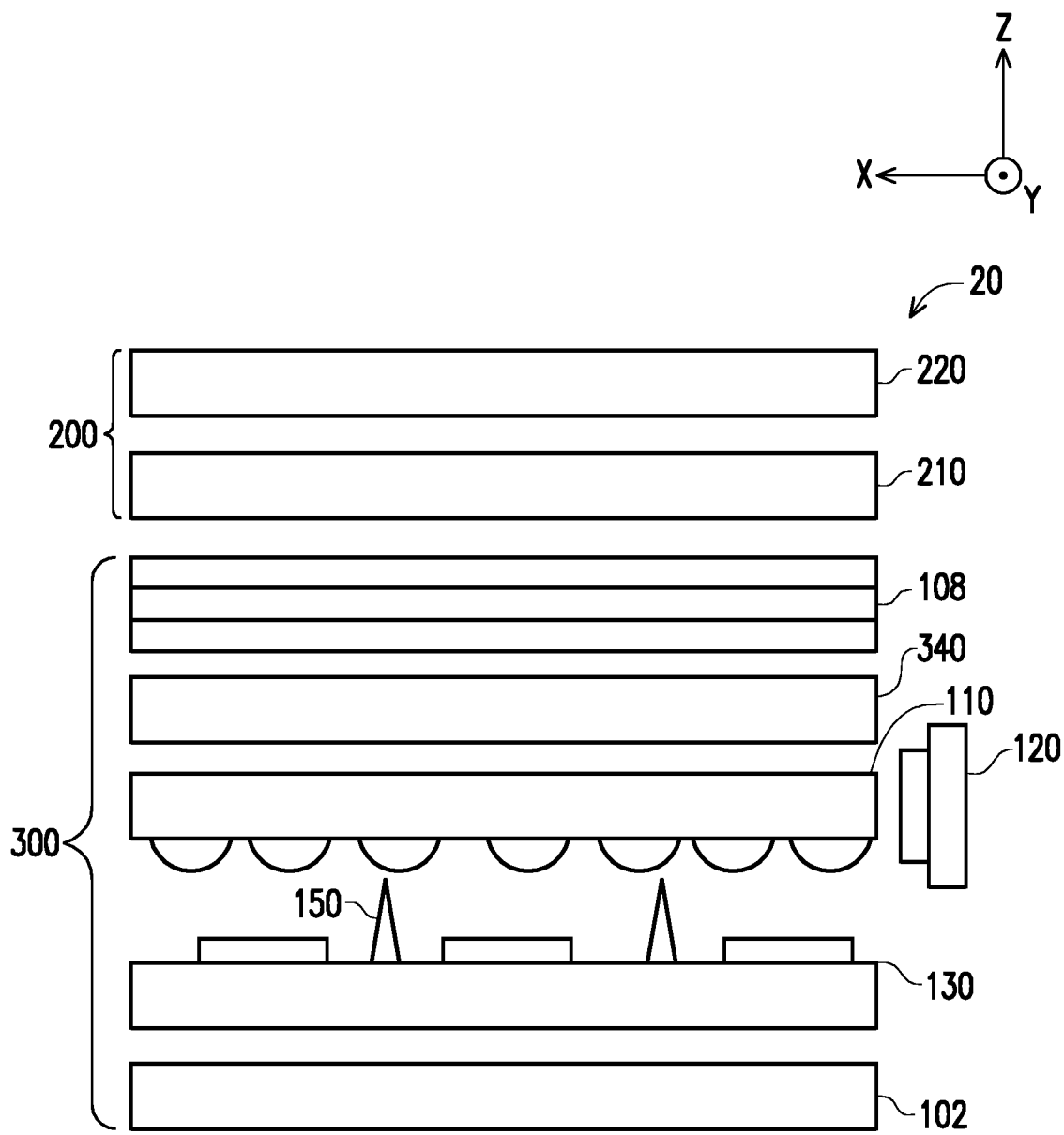
FIG. 3 is a structure schematic diagram of a touch display apparatus according to another embodiment of the disclosure.

FIG. 3 is a structure schematic diagram of a touch display apparatus according to another embodiment of the disclosure. Referring to FIG. 3, the touch display apparatus 20 depicted in FIG. 3 is similar to the touch display apparatus 10 illustrated in FIG. 1 and can be implemented by the embodiment of FIG. 2A. There is a difference between the backlight module 300 and the backlight module 100. More specifically, the position of a diffuser plate 340 is different from the position of the diffuser plate 140. The diffuser plate 340 is disposed above the second light source apparatus 130 along the Z direction, and the light guide plate 110 is disposed between the diffuser plate 340 and the second light source apparatus 130. The support devices 150 are still disposed on the surface S of the substrate 132 of the second light source apparatus 130 and configured to support the light guide plate 110. The diffuser plate 340 can uniform the brightness distribution of the second illumination beam IB2 affected by the light guide plate 110.

When the touch display apparatus 20 performs a touch mode, the controller 160 makes the EMR sensing module 102 sense a touch event and the first light source apparatus 120 provide the first illumination beam IB1 and turns off the second light source apparatus 130. When the touch display apparatus 20 performs a display mode, the controller 160 turns off the EMR sensing module 102 and the first light source apparatus 120, and makes the second light source apparatus 130 provide the second illumination beam IB2. The related embodiments and the configuration relationship of the touch display apparatus 20 of FIG. 3 are sufficiently taught, suggested, and implemented in the foregoing embodiments and implementations, and therefore are not described again.

Figure 4:
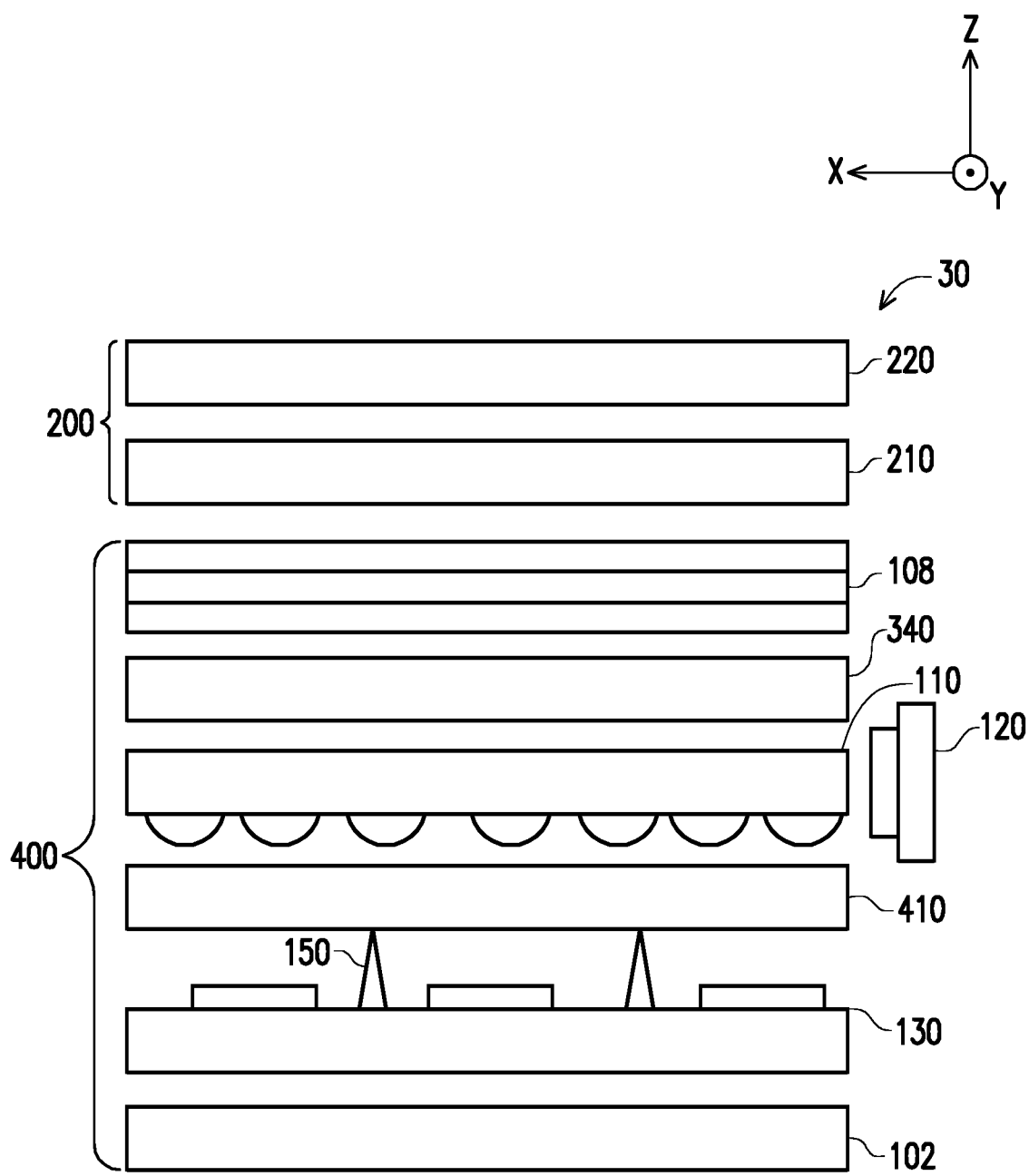
FIG. 4 is a structure schematic diagram of a touch display apparatus according to another embodiment of the disclosure.

FIG. 4 is a structure schematic diagram of a touch display apparatus according to another embodiment of the disclosure. Referring to FIG. 4, the touch display apparatus 30 depicted in FIG. 4 is similar to the touch display apparatus 20 illustrated in FIG. 3 and also can be implemented by the embodiment of FIG. 2A. The difference between the backlight module 300 and the backlight module 400 is that the backlight module 400 further includes a transparent plate 410. The transparent plate 410 is disposed along the Z direction between the second light source apparatus 130 and the light guide plate 110. The support devices 150 can support the transparent plate 410.

When the touch display apparatus 30 performs a touch mode, the controller 160 makes the EMR sensing module 102 sense a touch event and the first light source apparatus 120 provide the first illumination beam IB1 and turns off the second light source apparatus 130. When the touch display apparatus 30 performs a display mode, the controller 160 turns off the EMR sensing module 102 and the first light source apparatus 120, and makes the second light source apparatus 130 provide the second illumination beam IB2. The related embodiments and the configuration relationship of the touch display apparatus 30 of FIG. 4 are sufficiently taught, suggested, and implemented in the foregoing embodiments and implementations, and therefore are not described again.

In summary, an exemplary embodiment of the disclosure provides a touch display apparatus and a backlight module. The touch display apparatus includes the backlight module. The backlight module includes two different light source module for a display mode and a touch mode, respectively. An edge-type light source module is enabled in the touch mode and a direct-type light source module is enabled in the display mode to provide HDR display quality. Therefore, the touch display apparatus using the backlight module of the embodiments of the present disclosure have the effect of providing touch sensing function and displaying high contrast images.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch display apparatus comprising:
a backlight module, comprising:
an electromagnetic resonance sensing module, configured to emit an electromagnetic signal to a stylus pen;
an edge-type light source module, comprising:
a light guide plate, disposed above the electromagnetic resonance sensing module; and
a first light source apparatus, disposed beside the light guide plate for emitting a first illumination beam into the light guide plate; and
a direct-type light source module, comprising:
a second light source apparatus, comprising:
a substrate, disposed between the edge-type light source module and the electromagnetic resonance sensing module; and
a plurality of second light sources, disposed on a surface of the substrate and configured to emit a second illumination beam toward the edge-type light source module; and
a display module, disposed above the backlight module.

2. The touch display apparatus according to claim 1, further comprising:
a controller, electrically connected to the electromagnetic resonance sensing module, the edge-type light source module and the direct-type light source module,
wherein when performing a touch mode, the controller makes the electromagnetic resonance sensing module sense a touch event and the first light source apparatus provide the first illumination beam, and turns off the second light source apparatus, and
when performing a display mode, the controller turns off the electromagnetic resonance sensing module and the first light source apparatus, and makes the second light source apparatus provide the second illumination beam.

3. The touch display apparatus according to claim 2, wherein when the electromagnetic resonance sensing module does not receive a response signal from the stylus pen for more than or equal to a threshold time in the touch mode, the controller switches the touch mode to the display mode automatically.

4. The touch display apparatus according to claim 2, wherein the controller performs a touch sensing compensation on a response signal from the stylus pen or the electromagnetic signal according to a pre-stored interference result of electromagnetic waves passing through the unpowered second light source apparatus in the touch mode.

5. The touch display apparatus according to claim 2, wherein the controller performs a brightness compensation on the second illumination beam according to the pattern of the light guide plate in the display mode.

6. The touch display apparatus according to claim 2, wherein the controller performs local dimming on the second light source apparatus in the display mode.

7. The touch display apparatus according to claim 1, wherein the direct-type light source module further comprises:
a diffuser plate, disposed between the second light source apparatus and the light guide plate.

8. The touch display apparatus according to claim 1, wherein the direct-type light source module further comprises:
a diffuser plate, disposed above the second light source apparatus, wherein the light guide plate is disposed between the diffuser plate and the second light source apparatus.

9. The touch display apparatus according to claim 8, wherein the backlight module further comprises:
a transparent plate, disposed between the second light source apparatus and the light guide plate.

10. The touch display apparatus according to claim 9, wherein the backlight module further comprises:
a support device, disposed on the surface of the substrate with the second light sources and supporting the transparent plate.

11. A backlight module, adapted to a touch display apparatus and comprising:
an electromagnetic resonance sensing module, configured to emit an electromagnetic signal to a stylus pen;
an edge-type light source module, comprising:

a light guide plate, disposed above the electromagnetic resonance sensing module; and a first light source apparatus, disposed beside the light guide plate for emitting a first illumination beam into the light guide plate; and a direct-type light source module, comprising:

a second light source apparatus, comprising:

a substrate, disposed between the edge-type light source module and the electromagnetic resonance sensing module; and a plurality of second light sources, disposed on a surface of the substrate and configured to emit a second illumination beam toward the edge-type light source module.

12. The backlight module according to claim 11, further comprising:

a controller, electrically connected to the electromagnetic resonance sensing module, the edge-type light source module and the direct-type light source module, wherein when the electromagnetic resonance sensing module senses a touch event, the controller makes the first light source apparatus provide the first illumination beam and turns off the second light source apparatus, and when the electromagnetic resonance sensing module is turned off, the controller turns off the first light source apparatus and makes the second light source apparatus provide the second illumination beam.

\* \* \* \* \*